United States Patent
Nelson (10) Patent No.: US 12,538,503 B2
(45) Date of Patent: Jan. 27, 2026

(54) TRIMMABLE SEMICONDUCTOR-BASED CAPACITOR

(71) Applicant: KYOCERA AVX Components Corporation, Fountain Inn, SC (US)

(72) Inventor: Cory Nelson, Simpsonville, SC (US)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 556 days.

(21) Appl. No.: 17/969,821

(22) Filed: Oct. 20, 2022

(65) Prior Publication Data

US 2023/0140344 A1    May 4, 2023

Related U.S. Application Data

(60) Provisional application No. 63/274,567, filed on Nov. 2, 2021.

(51) Int. Cl.
| | |
|---|---|
| *H10D 1/66* | (2025.01) |
| *H01G 4/012* | (2006.01) |
| *H01G 4/10* | (2006.01) |
| *H01G 4/12* | (2006.01) |
| *H10D 1/00* | (2025.01) |
| *H10D 64/23* | (2025.01) |

(52) U.S. Cl.
CPC ............... *H10D 1/66* (2025.01); *H01G 4/012* (2013.01); *H01G 4/10* (2013.01); *H10D 1/047* (2025.01); *H10D 64/23* (2025.01); *H01G 4/1227* (2013.01); *H01G 4/1272* (2013.01)

(58) Field of Classification Search
CPC .......... H10D 1/66; H10D 1/047; H10D 64/23; H01G 4/012; H01G 4/10; H01G 4/1227; H01G 4/1272
See application file for complete search history.

(56) References Cited

U.S. PATENT DOCUMENTS

| | | | |
|---|---|---|---|
| 5,406,447 A | 4/1995 | Miyazaki | |
| 6,356,135 B1 * | 3/2002 | Rastegar | H03B 5/08 327/341 |
| 7,338,869 B2 | 3/2008 | Fukuda et al. | |
| 7,389,675 B1 | 6/2008 | Hunter et al. | |
| 7,554,146 B2 | 6/2009 | Won et al. | |
| 7,623,338 B2 | 11/2009 | Won | |

(Continued)

FOREIGN PATENT DOCUMENTS

KR    20000077182 A    12/2000

*Primary Examiner* — William B Partridge
*Assistant Examiner* — David Paul Sedorook
(74) *Attorney, Agent, or Firm* — Dority & Manning, P.A.

(57) ABSTRACT

A capacitor assembly includes a primary capacitor and a secondary capacitor formed on a substrate. The primary capacitor and the secondary capacitor can be connected by a conduction line. The conduction line can be formed from a thin metal connection. The conduction line can be severed, i.e., trimmed, to finely tune a capacitance value of the capacitor assembly. The capacitor assembly can allow for tighter tolerance and wider variance of the capacitance value of the capacitor assembly. The capacitor assembly can be trimmed after installing the capacitor assembly in the circuit, thereby enabling fine tuning of the capacitance value of the capacitor assembly for applications requiring precision tunable capacitance.

20 Claims, 3 Drawing Sheets

(56) References Cited

U.S. PATENT DOCUMENTS

| | | | |
|---|---|---|---|
| 8,609,486 B1* | 12/2013 | Smeys | H10D 1/047 |
| | | | 438/243 |
| 9,941,111 B2 | 4/2018 | Schmidt et al. | |
| 11,380,679 B2 | 7/2022 | Then et al. | |
| 2005/0017321 A1* | 1/2005 | Hakkarainen | H10D 84/212 |
| | | | 257/532 |
| 2008/0233744 A1* | 9/2008 | Kaul | B82Y 10/00 |
| | | | 438/684 |
| 2009/0213522 A1 | 8/2009 | Kim et al. | |
| 2012/0211865 A1* | 8/2012 | Tian | H10D 84/212 |
| | | | 257/532 |
| 2014/0367757 A1 | 12/2014 | Jakushokas et al. | |
| 2016/0351654 A1 | 12/2016 | Oh et al. | |
| 2020/0027946 A1 | 1/2020 | Liu et al. | |

* cited by examiner

FIG. 3

TRIMMABLE SEMICONDUCTOR-BASED CAPACITOR

CROSS REFERENCE TO RELATED APPLICATION

The present application claims filing benefit of U.S. Provisional patent application Ser. No. 63/274,567 having a filing date of Nov. 2, 2021, which is incorporated herein by reference in its entirety.

FIELD OF THE INVENTION

The subject matter of the present invention relates generally to a semiconductor-based capacitor assembly having selectively tunable capacitance values.

BACKGROUND

Semiconductor-based capacitors can provide a variety of benefits, such as temperature stability, generally high breakdown voltages, and low leakage currents. Thus, semiconductor-based capacitors may be desirable for use in a wide variety of applications, particularly those applications in which reliability when subjected to substantial mechanical and/or environmental stress is desired or necessary. However, some applications in which semiconductor-based capacitors may be desirable can require precision tunable capacitance of the capacitor. For instance, it may be desirable to finely tune the capacitance after the capacitor assembly is installed in a circuit.

Consequently, there is a need for a semiconductor-based capacitor that can offer more variety to enable formation of dynamic capacitor arrays within a limited area. In particular, a semiconductor-based capacitor assembly that is finely tunable in a circuit may be useful.

SUMMARY

Objects and advantages of the invention will be set forth in part in the following description, or may be obvious from the description, or may be learned through practice of the invention.

The present invention is directed to a capacitor assembly. The capacitor assembly includes: a substrate comprising a semiconductor material; a primary oxide layer formed on a surface of the substrate; a secondary oxide layer formed on a surface of the substrate; a primary conductive layer formed over at least a portion of the primary oxide layer; a secondary conductive layer formed over at least a portion of the secondary oxide layer; a first terminal connected with the primary conductive layer; and a conduction line formed over the substrate. The conduction line is connected between the primary conductive layer and the secondary conductive layer. The capacitor assembly has a capacitance value in a range from a minimum capacitance value to a maximum capacitance value.

In one particular embodiment, the primary oxide layer can be spaced apart from the secondary oxide layer.

In another embodiment, the secondary conductive layer can include a plurality of discrete conductive regions, wherein each of the plurality of discrete conductive regions are spaced apart from one another. Further, the conduction line can include a plurality of discrete conduction lines connecting each of the plurality of discrete conductive regions to the primary conductive layer.

In an additional embodiment, the conduction line can be formed from a thin layer of metal.

In yet another embodiment, the conduction line can include a first end connected to the primary conductive layer and a second end connected to the secondary conductive layer, wherein the conduction line is configured to be severed between the first end and the second end, further wherein severing the conduction line reduces a capacitance value of the capacitor assembly to less than the maximum capacitance value.

In a further embodiment, the minimum capacitance value can be defined by the primary conductive layer.

In still another embodiment, the maximum capacitance value can be defined by both the primary conductive layer and the secondary conductive layer.

In an additional embodiment, the capacitance value of the capacitor assembly can be adjusted between the minimum capacitance value and the maximum capacitance value in increments of about 0.05 pF.

In another embodiment, the primary oxide layer and the secondary oxide layer can be coplanar. Further, the primary conductive layer and the secondary conductive layer can be coplanar.

In a further embodiment, the capacitor assembly can further include an insulator layer formed over the primary oxide layer and/or the secondary oxide layer. Moreover, the insulator layer can be formed between the primary oxide layer and the primary conductive layer and/or between the secondary oxide layer and the secondary conductive layer.

In an additional embodiment, the semiconductor material of the substrate can include silicon.

In one more embodiment, the primary oxide layer can include silicon oxide and the secondary oxide layer can include silicon oxide.

The present invention is further directed to a method of forming a trimmable capacitor assembly. The method includes steps of: forming a primary oxide layer on a surface of a substrate comprising a semiconductor material; forming a secondary oxide layer on a surface of the substrate, wherein the secondary oxide layer is spaced from the primary oxide layer; depositing a primary conductive layer over at least a portion of the primary oxide layer; depositing a secondary conductive layer over at least a portion of the secondary oxide layer; depositing a first terminal on the first conductive layer; and depositing a conduction line over the substrate, wherein the conduction line connects between the primary conductive layer and the secondary conductive layer.

In one particular embodiment, the method can further include a step of trimming the conduction line at a point between the primary conductive layer and the secondary conductive layer to sever the connection between the primary conductive layer and the secondary conductive layer. Further, the step of trimming the conduction line can reduce a capacitance value of the capacitor assembly. Moreover, the method can further include a step of coupling the trimmable capacitor assembly to a substrate form an integrated circuit, wherein the step of trimming the conduction line can be performed after formation of the integrated circuit.

In another embodiment, the steps of depositing the primary conductive layer and the secondary conductive layer can include depositing a conductive material over the primary oxide layer and the secondary oxide layer and etching the conductive material to form the primary conductive layer and the secondary conductive layer, wherein the primary conductive layer and the secondary conductive layer can be spaced apart.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "about," "approximately," or "generally," when used to modify a value, indicates that the value can be raised or lowered by 5% and remain within the disclosed embodiment. Further, when a plurality of ranges are provided, any combination of a minimum value and a maximum value described in the plurality of ranges are contemplated by the present invention. For example, if ranges of "from about 20% to about 80%" and "from about 30% to about 70%" are described, a range of "from about 20% to about 70%" or a range of "from about 30% to about 80%" are also contemplated by the present invention.

Generally speaking, the present invention is directed to a capacitor assembly including a primary capacitor and a secondary capacitor formed on a substrate. The primary capacitor and the secondary capacitor can be connected by a conduction line. The conduction line can be formed from a thin metal connection. The conduction line can be severed, i.e., trimmed, to finely tune a capacitance value of the capacitor assembly. The present inventor has found that the capacitor assembly of the present invention can allow for tighter tolerance and wider variance of the capacitance value of the capacitor assembly. Further, the present inventor has found that the capacitor assembly can be trimmed after installing the capacitor assembly in the circuit, thereby enabling fine tuning of the capacitance value of the capacitor assembly for applications requiring precision tunable capacitance. As examples, the capacitance value of the capacitor assembly of the present invention can be tunable in increments as small as about 0.05 pF.

The MOS capacitor assembly can include a substrate including a semiconductor material, such as silicon, gallium arsenide, germanium, silicon carbide, strontium titanate, and/or mixtures thereof. The substrate can be doped with one or more suitable dopants, such as boron, arsenic, phosphorus, gallium, aluminum, indium, and antimony.

The surface of the substrate can generally be smooth. For example, the surface of the substrate can be free of pores, trenches, or the like. The oxide layer can have a generally uniform thickness on the surface of the oxide layer. For example, the thickness of the oxide layer can vary less than 20% across the oxide layer, in some embodiments less than 10%, and in some embodiments less than 5%. As used herein, the term "generally," e.g., "generally smooth" or "generally equal", does not necessarily mean that a characteristic is exactly or perfectly smooth or equal, and may allow a small difference if the respective layers are uniformly connected to adjacent layers within the capacitor assembly and/or when mounted to a substrate such as a circuit board.

As used herein, a first layer that is "formed over" a second layer may refer to the first layer being arranged over the second layer with respect to a thickness direction (i.e., the z-direction) of the monolithic substrate. The first layer may be directly in contact with the second layer. However, intermediate layers may also be formed therebetween such that the first layer and second layer do not directly contact each other.

The capacitor assembly can include an oxide layer formed on a surface of the substrate. The oxide layer can be or include silicon oxide and/or oxides of other example semiconductor materials described herein. The oxide layer can be grown in situ on the substrate. Lithography (e.g., photolithography) techniques can be used to define the shape of the oxide layer. For instance, portions of the oxide layer can be removed through etching such that the oxide layer is shaped as desired.

In some aspects of the invention, the capacitor assembly can include a primary oxide region and a secondary oxide region spaced apart from the primary oxide region. For instance, the oxide layer can be formed on the surface of the substrate, and the shapes of the primary oxide region and the secondary oxide region can be formed, e.g., by lithography techniques, after the oxide layer is formed. However, any suitable methods by which the primary oxide region and the secondary oxide region can be formed on the substrate are contemplated by the present invention.

One or more protective layers can be formed over the surface of the substrate. The terminals can be exposed through the protective layers for electrical connection when surface mounting the capacitor. Examples materials for the protective layer include benzocyclobutene (BCB), polyimide, silicon oxynitride, Al2O3, SiO2, Si3N4, epoxy, glass, or another suitable material.

For instance, the one or more protective layers can include an insulator layer formed over at least a portion of the oxide layer. The insulator layer can be or include silicon nitride and/or other electrically insulating materials described herein, including but not limited to silicon oxynitride (SiON). The insulator layer(s) can be formed over a first portion of the oxide layer that is distinct from a second portion of the oxide layer that is free of the insulator layer(s). Lithography (e.g., photolithography) techniques can be used to define the shape of the insulator layer, if desired. For instance, portions of the insulator layer can be removed through etching such that the insulator layer is shaped as desired and to expose at least a portion of the oxide layer below the insulator layer.

By providing an insulator layer formed over the oxide layer, the reliability of a capacitor can be improved. Specifically, any potential defects, e.g., pores, in the oxide layer and/or in the insulator layer are unlikely to be aligned in the Z-direction. For instance, the insulator layer may cover or fill in any defects, holes or imperfections in the surface of the oxide layer. As a result, forming the insulator layer over at least a portion of the oxide layer can reduce the likelihood that the capacitor will short-circuit. Thus, as described above, the capacitance value of the capacitor can be increased by providing the insulator layer formed over the oxide layer. For instance, the capacitance value may be increased by up to one and a half times when the insulator is formed over the oxide layer.

In some aspects of the present invention, the insulator layer can include a primary insulator region and a secondary insulator region spaced from the primary insulator region. The primary insulator region can be formed within a perimeter of the primary oxide region. The secondary insulator region can be formed within a perimeter of the secondary oxide region. The primary insulator region and/or secondary insulator region can be formed over any portion of the primary oxide layer or secondary oxide layer, respectively. For instance, in some aspects of the present invention, the capacitor assembly may include a primary insulator region formed over the primary oxide region, while there may be no secondary insulator region present over the secondary insulator region, or vice versa.

The capacitor assembly can include a conductive layer formed over at least a portion of the oxide layer. The conductive layer can be contained within a perimeter of the oxide layer. The conductive layer can be free of direct contact and/or direct electrical connection with the substrate. The conductive layer can be or include metal, such as aluminum, copper, gold, silver, nickel, or mixtures thereof.

The conductive layer can include a primary conductive region and a secondary conductive region. The primary conductive region can be formed over the primary oxide region. The secondary conductive region can be formed over the secondary oxide region. The secondary conductive region can be spaced apart from the primary conductive region such that the primary conductive region and the secondary conductive region are not directly in contact with each other. In other words, the material of the primary conductive region does not touch the material of the secondary conductive region, and at least a portion of the surface of the substrate and/or the oxide layer can be exposed between the primary conductive region and the secondary conductive region.

The capacitor assembly can include a conduction line connected between the primary conductive region and the secondary conductive region. The conduction line can be formed from a thin line of metal, e.g., aluminum or any other suitable conductive material. The conduction line can be configured to be trimmed, i.e., the connection between the primary conductive region and the secondary conductive region severed. For instance, the conduction line can be trimmed by a laser or any other suitable means.

In some aspects of the present invention, the secondary conductive region can comprise a plurality of discrete secondary conductive regions spaced apart from one another. In such an arrangement, the capacitor assembly can include a discrete conduction line connected between each of the plurality of discrete secondary conductive regions and the primary conductive region.

The capacitor assembly of the present invention can be formed as a thin-film capacitor assembly, i.e., having one or more thin-film layers. For instance, the conductive layer, the oxide layer, and the insulator layer can each be formed as a thin-film layer, respectively. The thin-film components may be formed of a variety of suitable materials. The thin-film capacitor may include one or more conductive layers. The conductive layer(s) may include a variety of suitable conductive materials. Example conductive materials include copper, nickel, gold, tin, lead, palladium, silver, and alloys thereof. Any conductive metallic or non-metallic material that is suitable for thin-film fabrication may be used, however.

Various thin-film techniques can be used to form thin-film layers, such as the conductive layer, insulator layer(s), terminals, or the like. Examples of such techniques that may be employed include chemical deposition (e.g., chemical vapor deposition), physical deposition (e.g., sputtering), or any other suitable deposition technique for forming thin-film elements. Additional examples include any suitable patterning technique (e.g., photolithography), etching, and any other suitable subtractive technique for forming thin-film elements.

The thin-film layers can have a range of thicknesses. For example, the thin-film layers can have thicknesses that can range from about 0.0375 micrometers (microns) to about 40 microns, in some embodiments from about 0.1 microns to about 30 microns, in some embodiments from about 0.2 microns to about 20 microns in some embodiments from about 0.4 microns to about 10 microns.

The thin-film components may be precisely formed using a variety of suitable subtractive, semi-additive, or fully additive processes. For example, physical vapor deposition and/or chemical deposition may be used. For instance, in some embodiments, the thin-film components may be formed using sputtering, a type of physical vapor deposition. A variety of other suitable processes may be used, however, including plasma-enhanced chemical vapor deposition (PECVD), electroless plating, and electroplating, for example. Lithography masks and etching may be used to produce the desired shape of the thin-film components. A variety of suitable etching techniques may be used including dry etching using a plasma of a reactive or non-reactive gas (e.g., argon, nitrogen, oxygen, chlorine, boron trichloride) and/or wet etching.

The capacitor assembly can include a first terminal connected with the conductive layer. For instance, the first terminal can be connected with the first conductive region. As used herein "connected with" can refer to components that are in directly physically contact. "Connected with" can also refer to items that are physically connected by one or intermediate conductive layers such that the items are in direct electrically connection (e.g., without a resistive layer or dielectric layer therebetween). The first terminal can be formed over the conductive layer, e.g., formed over the first conductive region. For instance, the first terminal can be coupled to the conductive layer, e.g., directly contacting with the conductive layer. The first terminal can be contained within a perimeter of the conductive layer, e.g., within a perimeter of the first conductive region.

In some aspects of the present invention, only the first conductive region is configured for coupling with the first terminal. For instance, the secondary conductive region may not be configured for coupling with a terminal such as a wire bondable terminal.

The capacitor assembly can have a second terminal connected with a surface of the substrate, e.g., a surface of the substrate opposite the surface of the substrate upon which the oxide layer is formed in the Z-direction. The second terminal can connect to a ground or act as a ground on the backside of the substrate. The first terminal can be spaced apart from the second terminal of the substrate in a Z-direction. The second terminal can be formed by a bare surface of the substrate. Additionally or alternatively, the second terminal can include a second conductive layer formed over a surface of the substrate opposite the surface of the substrate upon which the oxide layer is formed in the Z-direction.

A capacitor can be formed between the first terminal and the second terminal. The capacitor can have a minimum capacitance value and a maximum capacitance value. The minimum capacitance value can be defined by the area of the primary oxide region and primary conductive region coupled between the first terminal and the second terminal. The maximum capacitance value can be defined by the cumulative capacitance value of the primary oxide region and primary conductive region coupled between the first terminal and the second terminal, and the capacitance value of the capacitive elements formed by the secondary conductive region, the secondary oxide region and the substrate, when each conduction line remains intact. Depending on the area of the capacitor chip, as described above, as well as additional factors including the dielectric constant and properties of the materials used to form the capacitor, the capacitor assembly can maintain a capacitance value in a range between about 0.1 pF and about 1800 pF, such as from about 1 pF to about 1500 pF, for instance from about 10 pF to about 1000 pF.

The trimmable capacitor assembly of the present invention can have a precisely tunable capacitance value between the minimum capacitance value and the maximum capacitance value. For instance, one or more conduction lines between one or more of the discrete secondary conductive regions and the primary conductive region can be selectively trimmed or severed in order to disconnect any electrical connection, thereby reducing the capacitance value of the capacitor assembly. In some aspects of the present invention, the capacitance value of the trimmable capacitor assembly can be tuned in increments as small as about 0.05 pF. The increments by which the capacitance value of the trimmable capacitor assembly can be tuned can be directly related to the area of each discrete secondary conductive region and the number of discrete secondary conductive regions present on the capacitor chip, i.e., substrate.

A method of forming the capacitor assembly can include steps of: forming a primary oxide layer on a surface of a substrate comprising a semiconductor material; forming a secondary oxide layer on a surface of the substrate, wherein the secondary oxide layer is spaced from the primary oxide layer; depositing a primary conductive layer over at least a portion of the primary oxide layer; depositing a secondary conductive layer over at least a portion of the secondary oxide layer; depositing a first terminal on the first conductive layer; and depositing a conduction line over the substrate, wherein the conduction line connects between the primary conductive layer and the secondary conductive layer.

The method can include a step of trimming the conduction line at a point between the primary conductive layer and the secondary conductive layer to sever the connection between the primary conductive layer and the secondary conductive layer. The step of trimming the conduction line can reduce a capacitance value of the capacitor assembly.

The method can include a step of coupling the trimmable capacitor assembly to a substrate form an integrated circuit. The step of trimming the conduction line can be performed after formation of the integrated circuit, e.g., after coupling the capacitor assembly to the substrate.

The steps of depositing the primary conductive layer and the secondary conductive layer can include depositing a conductive material over the primary oxide layer and the secondary oxide layer and etching the conductive material to form the primary conductive layer and the secondary conductive layer. The primary conductive layer and the secondary conductive layer can be spaced apart.

Figure 1:
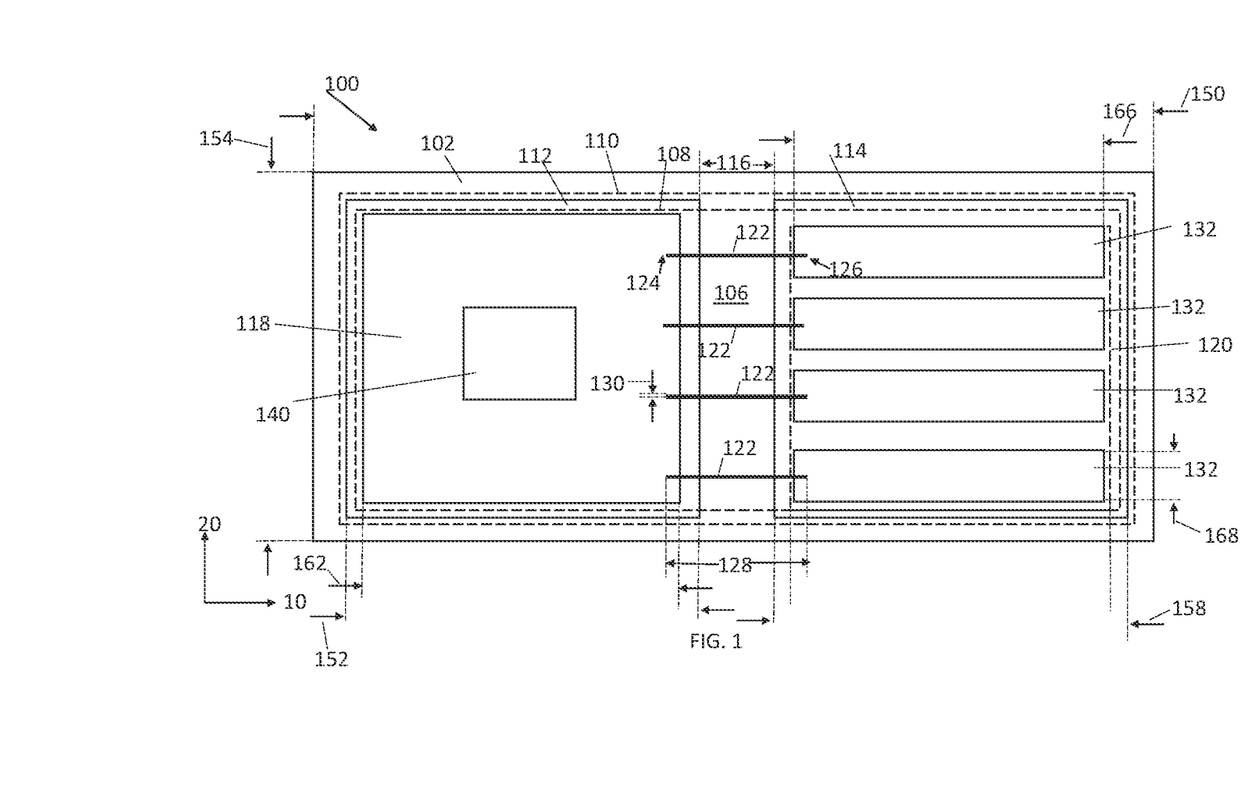
FIG. 1 illustrates a top view of a capacitor assembly according to one particular embodiment of the present invention.
Figure 2:
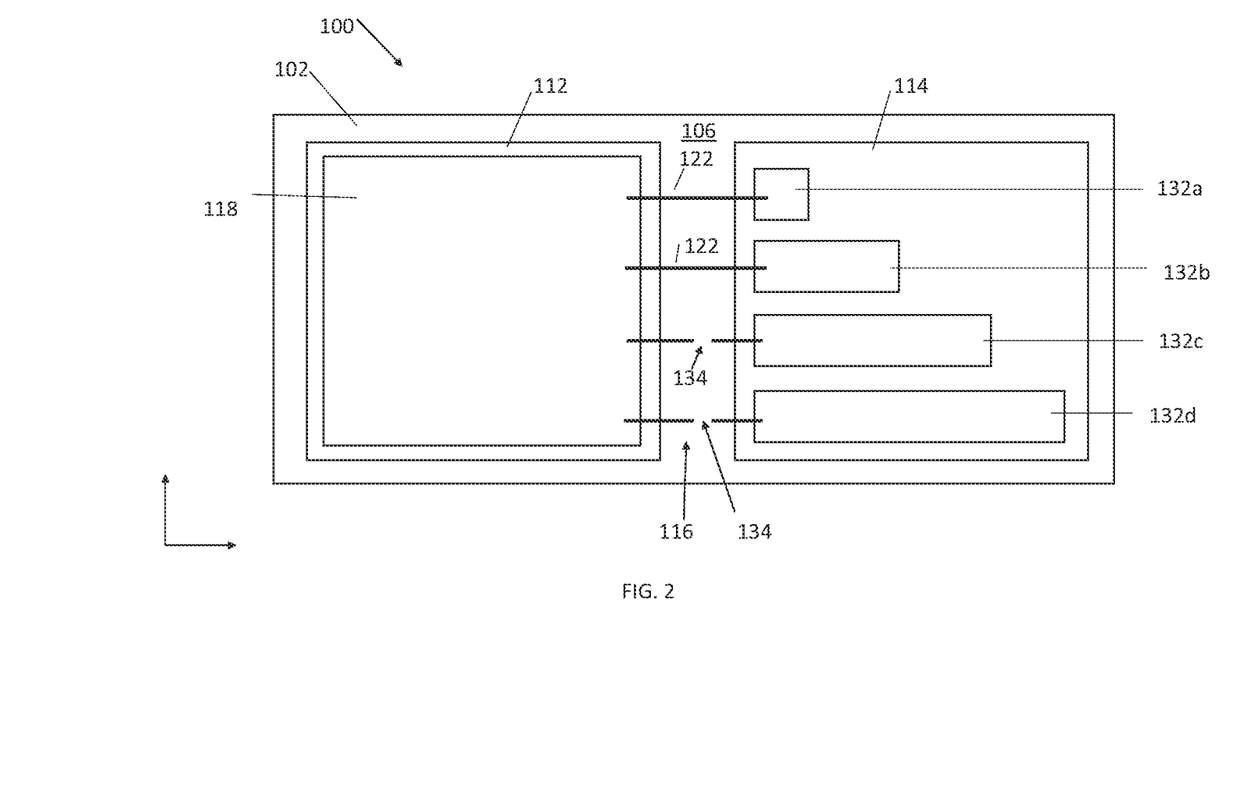
FIG. 2 illustrates a top view of another embodiment of a capacitor assembly according to one particular embodiment of the present invention.
Figure 3:
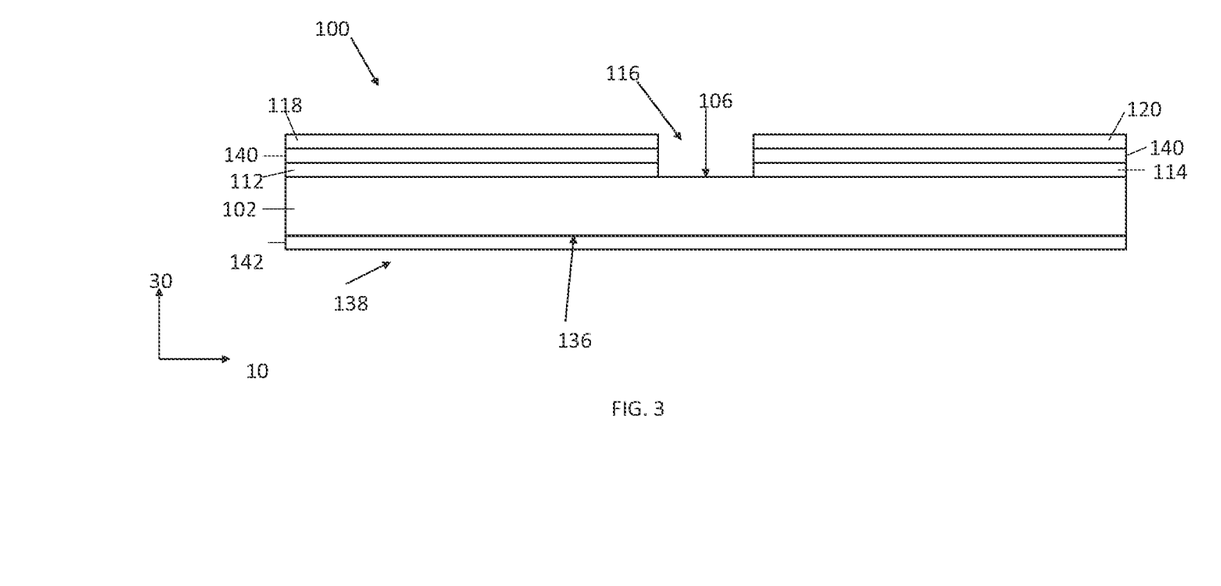
FIG. 3 illustrates a side cutaway view of the capacitor assembly of FIG. 1 taken parallel to an X-direction.

The specific features of the trimmable capacitor assembly of the present invention may be better understood with reference to FIGS. 1-3.

FIG. 1 is a top view of a capacitor assembly 100 according to aspects of the present disclosure. The capacitor assembly 100 can include a substrate 102 including a semiconductor material, such as silicon. The capacitor assembly 100 can include an oxide layer 104 formed on a surface 106 of the substrate 102. The capacitor assembly 100 can include a conductive layer 108 formed over at least a portion of the oxide layer 104. The conductive layer 108 can be contained within a perimeter 110 of the oxide layer 104. The conductive layer 108 can be free of direct contact and/or direct electrical connection with the substrate 102.

The substrate 102 can be a monolithic substrate that includes a surface 106 as described above. The surface 106 can be a top surface of the substrate 102. The substrate 102 can include a first side and a second side which each extend parallel to an X-direction 10. The substrate 102 can include a first edge and a second edge which each extend parallel to a Y-direction 20 perpendicular to the X-direction 10. The top surface 106 can extend between the first side and the second side in the X-direction 10 and between the first edge and the second edge in the Y-direction 20. The substrate 102 can further include a bottom surface, i.e., backside, that extends parallel to the top surface 106 in a vertical Z-direction 30. The bottom surface can extend between the first side and the second side in the X-direction 10 and between the first edge and the second edge in the Y-direction 20.

The oxide layer 104 can be formed exclusively on the top surface 106 of the substrate 102. For instance, the oxide layer 104 can be formed within the perimeter of the surface 106. The oxide layer 104 can extend over the entire top surface 106, i.e., from the first side to the second side from the first edge to the second edge, or any portion thereof. For instance, the oxide layer 104 can include a primary oxide region 112 and a secondary oxide region 114. The primary oxide region 112 and the secondary oxide region 114 can be spaced apart by a trimming region 116.

A ratio of a length 150 of the substrate 102 to a length 152 of the primary oxide region 112 may be less than about 5, such as less than about 3, such as less than about 2. For instance, a ratio of a length 150 of the substrate 102 to a length 152 of the primary oxide region 112 can be in a range from about 1.25:1 to about 5:1. A ratio of a width 154 of the substrate 102 to a width 156 of the primary oxide region 112 may be less than about 5, such as less than about such as less than about 3, such as less than about 2. For instance, a ratio of a width 154 of the substrate 102 to a width 156 of the primary oxide region 112 can be in a range from about 1.25:1 to about 5:1.

A ratio of a length 150 of the substrate 102 to a length 158 of the secondary oxide region 114 may be less than about 5, such as less than about 3, such as less than about 2. For instance, a ratio of a length 150 of the substrate 102 to a length 158 of the secondary oxide region 114 can be in a range from about 1.25:1 to about 5:1. A ratio of a width 154 of the substrate 102 to a width 160 of the secondary oxide region 114 may be less than about 5, such as less than about such as less than about 3, such as less than about 2. For instance, a ratio of a width 154 of the substrate 102 to a width 160 of the secondary oxide region 114 can be in a range from about 1.25:1 to about 5:1.

The conductive layer 108 can include a primary conductive region 118 formed over the primary oxide region 112. For instance, the primary conductive region 118 can be formed within a perimeter of the primary oxide region 112. A primary capacitor can be formed between the primary conductive region 118 and the substrate 102. The primary conductive region 118 can be free of direct contact and/or direct electrical connection with the substrate 102. In this regard, the primary conductive region 118 can have the same, or generally similar, shape and size as the primary oxide layer 112. For instance, a ratio of a length 150 of the substrate 102 to a length 162 of the primary conductive region 118 may be less than about 5, such as less than about 3, such as less than about 2. For instance, a ratio of a length 150 of the substrate 102 to a length 162 of the primary conductive region 112 can be in a range from about 1.25:1 to about 5:1. A ratio of a width 154 of the substrate 102 to a width 164 of the primary conductive region 118 may be less than about 5, such as less than about such as less than about 3, such as less than about 2. For instance, a ratio of a width 154 of the substrate 102 to a width 164 of the primary conductive region 118 can be in a range from about 1.25:1 to about 5:1.

A first terminal 140 can be connected with the conductive layer 108. In particular, the first terminal 140 can be connected with the primary conductive region 118. The first terminal 140 can be exposed along the surface 106 of the substrate 102. For example, each of the first terminal 140 can be formed exclusively on the oxide layer 104, e.g., exclusively on the primary oxide region 112. The first terminal 140 can be configured for bonding to a substrate such as a circuit board, e.g., by wire bonding or any other suitable means.

The capacitor assembly 100 can include a second terminal 138 on the bottom surface 136 of the substrate 102. The second terminal 130 can be formed by the bare material of the bottom surface 136 of the semiconductor substrate 102. Additionally or alternatively, the second terminal 138 can be formed from a layer 142 of conductive material formed over the bottom surface 136 of the substrate 102 opposite the top surface 106 in the Z-direction. The second terminal 138 can connect to a ground or act as a ground on the backside of the substrate 102.

Turning again to the conductive layer 108, the conductive layer 108 can also include a secondary conductive region 120. The secondary conductive region 120 can be formed over the secondary oxide region 114, e.g., within a perimeter of the secondary oxide region 114. The secondary conductive region 120 can be free of direct contact and/or direct electrical connection with the substrate 102.

A conduction line 122 can be provided between the primary conductive region 118 and the secondary conductive region 120. The conduction line can be formed from a thin layer of conductive material, e.g., metal, such as aluminum or any other suitable material. The conduction line 122 can form an electrical connection between the first conductive region 118 and the second conductive region 120. The conduction line 122 can have a length 128 extending from a first end 124 of the conduction line 122 connected with the primary conductive region 118 to a second end 126 of the conduction line 122 connected with the secondary conductive region 120. The conduction line 122 can have a width 130 extending perpendicular to the length 128. As described above, the conduction line 122 can be trimmed, e.g., laser trimmed, to sever the connection between the primary conductive region 118 and the secondary conductive region 120 along the conduction line 122.

The secondary conductive region 120 can include a plurality of discrete conductive regions 132. Each of the discrete conductive regions 132 can be formed within the secondary conductive region 120. Each of the discrete conductive regions 132 can be connected with the primary conductive region 118 by a conduction line 122. A capacitor can be formed between each of the discrete conductive regions 132 and the substrate 120. The discrete conductive regions 132 need not be configured for bonding with a circuit. Stated differently, the discrete conductive regions 132 can have dimensions that are not suitable for bonding, e.g., wire-bonding, with a circuit. Instead, the connection between the discrete conductive regions 132 and the primary conductive region 118 via the conduction lines 122 can provide additional capacitance to the overall capacitance value of the capacitor assembly 100.

Each conductive region 132 can have a length 166 and a width 168. In the embodiment illustrated in FIGS. 1-2, each of the conductive regions 132 has an approximately equal length 166 and width 168. However, it is to be understood that the present invention contemplates a plurality of discrete conductive regions 132 which may have varying dimensions in terms of length 166 and width 168. As the area, determined by the length 166 and width 168, of each discrete conductive region 132 can determine the incremental capacitance value of each respective discrete capacitor, providing discrete conductive regions 132 having varying dimensions can enable the capacitor assembly to be tuned in varying increments to be customized and/or tuned to a precise capacitance value.

Nevertheless, it may be useful for each discrete conductive region 132 to have a length 166 and width 168 that are sufficiently sized to be visible on the surface 106 of the substrate 102. The visibility of each discrete conductive region 132 can enable easier determination of how and where to trim the conduction line(s) 122 to achieve a precise capacitance value.

Thus, a ratio of the length 150 of the substrate 102 to a length 166 of any of the discrete conductive regions 132 can be less than about 50, such as less than about 20, e.g., less than about 10. A ratio of the length 150 of the substrate 102 to a length 166 of any of the discrete conductive regions 132 can be in a range from about 50:1, such as from about 20:1, such as from about 5:1. A ratio of the width 154 of the substrate 102 to the width 168 of any of the discrete conductive regions 132 can be less than about 50, such as less than about 20, e.g., less than about 10. A ratio of the width 154 of the substrate 102 to the width 168 of any of the discrete conductive regions 132 can be in a range from about 50:1, such as from about 20:1, such as from about 5:1. The present inventors have found that such distances and ratios can provide a capacitor assembly with a plurality of capacitive regions defined by each of the discrete conductive regions that can enable precision incremental tuning of the capacitance value of the capacitor assembly 100 in increments as small as about 0.05 pF.

As shown in FIG. 2, the conduction line 122 can be trimmed or severed between the first end 124 and the second end 126. The trimmed portion 134 can be disposed within the trimming region 116.

For instance, FIG. 2 illustrates a capacitor assembly 100 having a plurality of discrete conductive regions 132a, 132b, 132c, 132d formed over the secondary oxide region 114. Each of the discrete conductive regions 132a, 132b, 132c, 132d can have varying dimensions. For instance, as shown in FIG. 2, discrete conductive regions 132a, 132b, 132c, 132d can have a different length 166 in the X-direction. The present invention further contemplates that the discrete conductive regions 132a, 132b, 132c, 132d can have varying widths 168 in the Y-direction as well.

The directionality of the primary oxide region 112 and the primary conductive region 118 relative to the secondary oxide region 114 and the secondary conductive region 120 in the X-direction 10 and Y-direction 20 is not critical to the present invention. For instance, FIGS. 1 and 2 illustrate the primary oxide region 112 and the primary conductive region 118 being spaced apart from the secondary oxide region 114 and the secondary conductive region 120 in the X-direction 10. The present invention further contemplates arrangements of the capacitor assembly 100 in which the primary oxide region 112 and the primary conductive region 118 are spaced apart from the secondary oxide region 114 and the secondary conductive region 120 in the Y-direction 20. Moreover, the present invention contemplates further arrangements of one or more secondary oxide regions 114 and secondary conductive regions 120 that can be spaced from the primary oxide region 112 and the primary conductive region 118 in one or both of the X-direction 10 and the Y-direction 20.

The present invention further contemplates an insulator layer 140 formed over the oxide layer 104, e.g., as shown in FIG. 3. The insulator layer 140 can be formed directly on the oxide layer 104. For instance, the insulator layer 140 can be formed between the oxide layer 104 and the conductive layer 108. The insulator layer 140 can extend over some or all of the oxide layer 104, e.g., over some or all of the primary oxide region 112 and/or the secondary oxide region 114. In some aspects of the present invention, the insulator layer 140 can be formed over the primary oxide region 112 and no insulator layer 140 formed over the secondary oxide region 114.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A capacitor assembly comprising:
    a substrate comprising a semiconductor material;
    a primary oxide layer formed on a surface of the substrate;
    a secondary oxide layer formed on a surface of the substrate;
    a primary conductive layer formed over at least a portion of the primary oxide layer;
    a secondary conductive layer formed over at least a portion of the secondary oxide layer;
    a first terminal connected with the primary conductive layer; and
    a conduction line formed over the substrate, wherein the conduction line is connected between the primary conductive layer and the secondary conductive layer;
    wherein the capacitor assembly comprises a capacitance value in a range from a minimum capacitance value to a maximum capacitance value,
    wherein the conduction line is configured to be severed between the first end and the second end at a trimmed portion, wherein the conduction line maintains connection with the primary conductive layer and the secondary conductive layer when the conduction line is severed at the trimmed portion.

2. The capacitor assembly of claim 1, wherein the primary oxide layer is spaced apart from the secondary oxide layer.

3. The capacitor assembly of claim 1, wherein the secondary conductive layer comprises a plurality of discrete conductive regions,
    wherein each of the plurality of discrete conductive regions are spaced apart from one another.

4. The capacitor assembly of claim 3, wherein the conduction line comprises a plurality of discrete conduction lines connecting each of the plurality of discrete conductive regions to the primary conductive layer.

5. The capacitor assembly of claim 1, wherein the conduction line is formed from a thin layer of metal.

6. The capacitor assembly of claim 1, wherein the conduction line comprises a first end connected to the primary conductive layer and a second end connected to the secondary conductive layer,
    further wherein severing the conduction line reduces a capacitance value of the capacitor assembly to less than the maximum capacitance value.

7. The capacitor assembly of claim 1, wherein the minimum capacitance value is defined by the primary conductive layer.

8. The capacitor assembly of claim 1, wherein the maximum capacitance value is defined by both the primary conductive layer and the secondary conductive layer.

9. The capacitor assembly of claim 1, wherein the capacitance value of the capacitor assembly can be adjusted between the minimum capacitance value and the maximum capacitance value in increments of about 0.05 pF.

10. The capacitor assembly of claim 1, wherein the primary oxide layer and the secondary oxide layer are coplanar.

11. The capacitor assembly of claim 10, wherein the primary conductive layer and the secondary conductive layer are coplanar.

12. The capacitor assembly of claim 1, further comprising an insulator layer formed over the primary oxide layer and/or the secondary oxide layer.

13. The capacitor assembly of claim 12, wherein the insulator layer is formed between the primary oxide layer and the primary conductive layer and/or between the secondary oxide layer and the secondary conductive layer.

14. The capacitor assembly of claim 1, wherein the semiconductor material of the substrate comprises silicon.

15. The capacitor assembly of claim 1, wherein the primary oxide layer comprises silicon oxide and the secondary oxide layer comprises silicon oxide.

16. A method of forming a trimmable capacitor assembly comprising:

forming a primary oxide layer on a surface of a substrate comprising a semiconductor material;

forming a secondary oxide layer on a surface of the substrate, wherein the secondary oxide layer is spaced from the primary oxide layer;

depositing a primary conductive layer over at least a portion of the primary oxide layer;

depositing a secondary conductive layer over at least a portion of the secondary oxide layer;

depositing a first terminal on the first conductive layer; and depositing a conduction line over the substrate, wherein the conduction line connects between the primary conductive layer and the secondary conductive layer, wherein the conduction line is configured to maintain connection with each of the primary conductive layer and the secondary conductive layer.

17. The method of claim 16, further comprising a step of trimming the conduction line at a point between the primary conductive layer and the secondary conductive layer to sever the connection between the primary conductive layer and the secondary conductive layer.

18. The method of claim 17, wherein the step of trimming the conduction line reduces a capacitance value of the capacitor assembly.

19. The method of claim 17, further comprising a step of coupling the trimmable capacitor assembly to a substrate form an integrated circuit, wherein the step of trimming the conduction line is performed after formation of the integrated circuit.

20. The method of claim 16, wherein the steps of depositing the primary conductive layer and the secondary conductive layer comprise depositing a conductive material over the primary oxide layer and the secondary oxide layer and etching the conductive material to form the primary conductive layer and the secondary conductive layer, wherein the primary conductive layer and the secondary conductive layer are spaced apart.

* * * * *